United States Patent [19]
Beale et al.

[11] Patent Number: 6,128,679
[45] Date of Patent: Oct. 3, 2000

[54] COMPUTER FOR EXECUTING I/O INSTRUCTIONS, BY EMULATION, IN A FOREIGN APPLICATION PROGRAM WHEREIN THE EMULATOR RESULT THREAD IS BLOCKED FROM RUNNING BETWEEN PROCESSES

[75] Inventors: Andrew Ward Beale, Aliso Viejo; Bong Jae Lee, Laguna Niguel, both of Calif.; Dwayne Eugene Ebersole, Lancaster, Pa.

[73] Assignee: Unisys Corporation, Blue Bell, Pa.

[21] Appl. No.: 09/031,138

[22] Filed: Feb. 26, 1998

[51] Int. Cl.[7] .................................................. G06F 13/10
[52] U.S. Cl. ........................... 710/62; 709/230; 709/249; 709/304; 710/63; 710/11
[58] Field of Search .................................... 709/249, 230, 709/304; 710/62, 63, 11

[56] References Cited

U.S. PATENT DOCUMENTS

| | | | |
|---|---|---|---|
| 5,036,484 | 7/1991 | McCoy et al. | 710/62 |
| 5,218,697 | 6/1993 | Chung | 709/230 |
| 5,241,682 | 8/1993 | Bryant et al. | 709/249 |
| 5,530,845 | 6/1996 | Hiatt et al. | 710/62 |
| 5,666,519 | 9/1997 | Hayden | 709/304 |
| 5,881,269 | 3/1999 | Dobbelstein | 395/500.42 |

OTHER PUBLICATIONS

Selective Start and Stop of 3270 Sessions, IBM TDB n11 04–09 p. 150, Apr., 1993.

Primary Examiner—Thomas C. Lee
Assistant Examiner—Tammara Peyton
Attorney, Agent, or Firm—Charles J. Fassbender; Mark T. Starr; Steven B. Samuels

[57] ABSTRACT

A computer for executing I/O instructions, by emulation, in a foreign application program includes an emulator program which has a Send thread, a Get thread, and single Result thread. The Send thread calls into a native operating system for the computer to send data from the foreign application program to an I/O port. The Get thread calls into the native operating system to receive data from the I/O port for the foreign application program. The Result thread processes one result descriptor from the native operating system when data is sent for the Send thread, and processes another result descriptor from the native operating system when data is received for the Get thread, and is completely blocked from running on the computer between the processing of the result descriptors. These threads are cleared, asynchronously with respect to the transfer of any data, by sending a CLEAR command from the emulator to the native operating system which responds by unblocking the Result thread and sending it a dummy result descriptor.

11 Claims, 7 Drawing Sheets

COMPUTER FOR EXECUTING I/O
INSTRUCTIONS, BY EMULATION, IN A
FOREIGN APPLICATION PROGRAM
WHEREIN THE EMULATOR RESULT
THREAD IS BLOCKED FROM RUNNING
BETWEEN PROCESSES

BACKGROUND OF THE INVENTION

This invention relates to digital computers for executing I/O instructions, that occur in an application program which is foreign to the computer.

As background to the invention, FIG. 1 shows a conventional communications network 1 on which data is sent and received. This network 1 has multiple nodes to which respective digital computers are coupled. Four such nodes are indicated in FIG. 1 as Nodes J, K, L and M. Node J is coupled to a computer 10 which is comprised of an I/O processor 11, and x86 instruction processor 12, and a memory 13. Similarly, Node K is coupled to a computer 20 which is comprised of I/O processor 21, an A-Series instruction processor 22, and a memory 23.

Examples of the x86 instruction processor include the Intel 386 processor, the Intel 486 processor, the Intel Pentium processor, the Intel Merced processor, and any other processor which has a compatible set of object code instructions. Examples of the A-Series instruction processor include the Unisys A7 processor, the Unisys A11 processor, the Unisys A16 processor, and any other processor which has a compatible set of object code instructions.

Included in the memory 13 of the x86 instruction processor 12 is a native operating system 14 and multiple native application programs 15a–15n. This operating system 14 and all of the programs 15a–15n are native to the x86 instruction processor 12 because they are a compilation of object code instructions that are executed directly by the x86 instruction processor. One suitable operating system 14 is the NT operating system from Microsoft Corporation.

Similarly, included in the memory 23 of the A-Series instruction processor 22 is a native A-Series operating system 24 and multiple native application programs 25a through 25n. This operating system 24 and all of the programs 22a–25n are native to the A-Series instruction processor 22 because they are a compilation of the A-Series object code instructions which are executed directly by the A-Series instruction processor.

To send data on the communication network 1 from an A-Series application program 25i, the program includes a NETSEND instruction 26. This instruction 26 has a field 26a which specifies that data is to be sent on the network 1, a field 26b which identifies a node on the network to which the data is to be sent, and a field 26c which points to the data that is to be sent. Likewise, to receive data from the network 1 in the A-Series application program 25i, the program includes a NETRCV instruction 27. Instruction 27 includes a field 27a which specifies that program 25i is to receive data from the network, and a field 27b which points to a buffer area in the memory 23 for storing the received data.

An example of how the I/O instructions 26 and 27 are performed is shown in FIG. 2. There, the I/O processor 21 includes a programmable controller 21a and a network interface circuit 21b. Various tasks are performed within the programmable controller 21a by an IOP Control thread 21a-1, an IOP Send thread 21a-2, and an IOP Get thread 21a-3. By a thread is herein meant a single stream of instructions for execution.

When the I/O instruction 26 is to be executed, the A-Series operating system transmits a SEND I/O command to the programmable controller 21a where it is received by the IOP Control thread 21a-1 as indicated by reference numeral 31. Then the IOP Control thread passes the SEND I/O command to a Send thread 21a-2 as indicated by reference numeral 32. In response, the IOP Send thread sends and receives control signals 33 to/from the network interface circuit 21b that cause the data to be sent to the network 10. After the data is sent, the IOP Send thread 21a-2 generates a result descriptor RDES which indicates the status of the data transfer, and it sends the result descriptor to the A-Series operating system as indicated by reference numeral 34. By a Result descriptor is herein meant any predetermined set of bits that allow the status of an I/O operation to be described.

Similarly, when the I/O instruction 27 is to be executed, the A-Series operating system transmits a GET I/O command to the programmable controller 21a where it is received by the IOP Control thread 21a-1 as indicated by reference numeral 35. Then the IOP Control thread passes the GET I/O command to the IOP Get thread 21a-3 as indicated by reference numeral 36. In response the IOP Get thread sends and receives control signals 37 to/from the network interface circuit 21b that cause the data to be received from the network 1. After the data is received, the IOP Get thread 21a-2 generates a result descriptor RDES which indicates the status of the data transfer, and it sends the result descriptor to the A-Series operating system as indicated by reference numeral 38.

In the above described FIGS. 1 and 2, the A-Series operating system 24 and its application programs 25a–25n are not executed by emulation because they consist of A-Series object code instructions that are native to the A-Series instruction processor 22. By comparison, if the A-Series operating system and/or the application programs 25a–25n were being executed by emulation, then they would all be executed by a different instruction processor under the control of another operating system which is native to that instruction processor.

For example, program 15n in the x86 computer 10 could be an A-Series emulator which interprets and executes all instructions in the A-Series operating system 24 and all of the A-Series application programs 25a–25n; and this is shown in FIG. 3. In FIG. 3, the operating system 24 and all of its application programs 25a–25n still consist of A-Series object code instructions; and they are foreign to the x86 instruction processor 12.

Inspection of FIG. 3 shows that the A-Series operating system 24 no longer interfaces directly with an I/O processor. Instead in FIG. 3, the A-Series operating system 24 is separated from the I/O processor by the A-Series emulator and the NT operating system. This separation presents a problem when the I/O instructions 26 and 27 are executed because the A-Series operating system 24 cannot interact directly with the I/O processor as it previously did in FIG. 2.

Accordingly, a primary object of the present invention is to provide a digital computer for executing I/O instructions, by emulation, that occur in an application program which is foreign to the computer.

BRIEF SUMMARY OF THE INVENTION

In accordance with one aspect of the present invention, a digital computer is comprised of the following components:
1) an instruction processor, coupled to a memory and an I/O port, which directly executes a first set of object code instructions;

2) a native operating system for all program in the memory, which is a compilation of instructions in the first set;

3) a foreign application program in the memory, which is a compilation of instructions in a second set that differs from the first set, including a transmit I/O instruction and a receive I/O instruction;

4) an emulator program, in the memory, which is a compilation of instructions in the first set that interprets the second set of instructions and includes a) an emulator Send thread which calls into the native operating system, to send data from the foreign application program to the I/O port in response to the transmit I/O instruction;

b) an emulator Get thread which calls into the native operating system to receive data for the foreign application program from the I/O port in response to the receive I/O instruction; and, c) a single emulator Result thread which processes one result descriptor from the native operating system when data is sent for the emulator Send thread and processes another result descriptor from the native operating system when data is received for the emulator Get thread, and is completely blocked from running between the processing of the result descriptors.

By providing the emulator Send thread which calls into the native operating system to send data, the task of sending and receiving control signals to/from the I/O port to cause the data to be sent is passed off to the native operating system. Likewise, by providing the emulator Get thread which calls into the native operating system to receive data, the task of sending and receiving control signals to/from the I/O port to receive data is passed off to the native operating system. Further, by providing the single emulator Result thread which processes result descriptors from the native operating system for both the send and the receive operation, the interface to the native operating system is simplified since all results are reported to a single thread. Also, by blocking the single emulator Result thread from running between the processing of the result descriptors, the overall performance of the emulator program is helped since the emulator Result thread wastes no run-time on the instruction processor as it waits for a result descriptor.

In accordance with another aspect of the invention, the emulator program further includes an emulator Control thread which sends a CLEAR command to the native operating system asynchronously with respect to the transfer of the data, and the emulator Result thread becomes unblocked and clears itself by receiving a result descriptor from the native operating system in response to the CLEAR command. This aspect of the invention is important because the execution of an I/O instruction can occur over a long period of time; and by causing a result descriptor to be sent from the native operating system in response to the CLEAR command, the emulator Result thread is unblocked without waiting for the execution of the I/O instruction to be completed.

DETAILED DESCRIPTION

Figure 3:
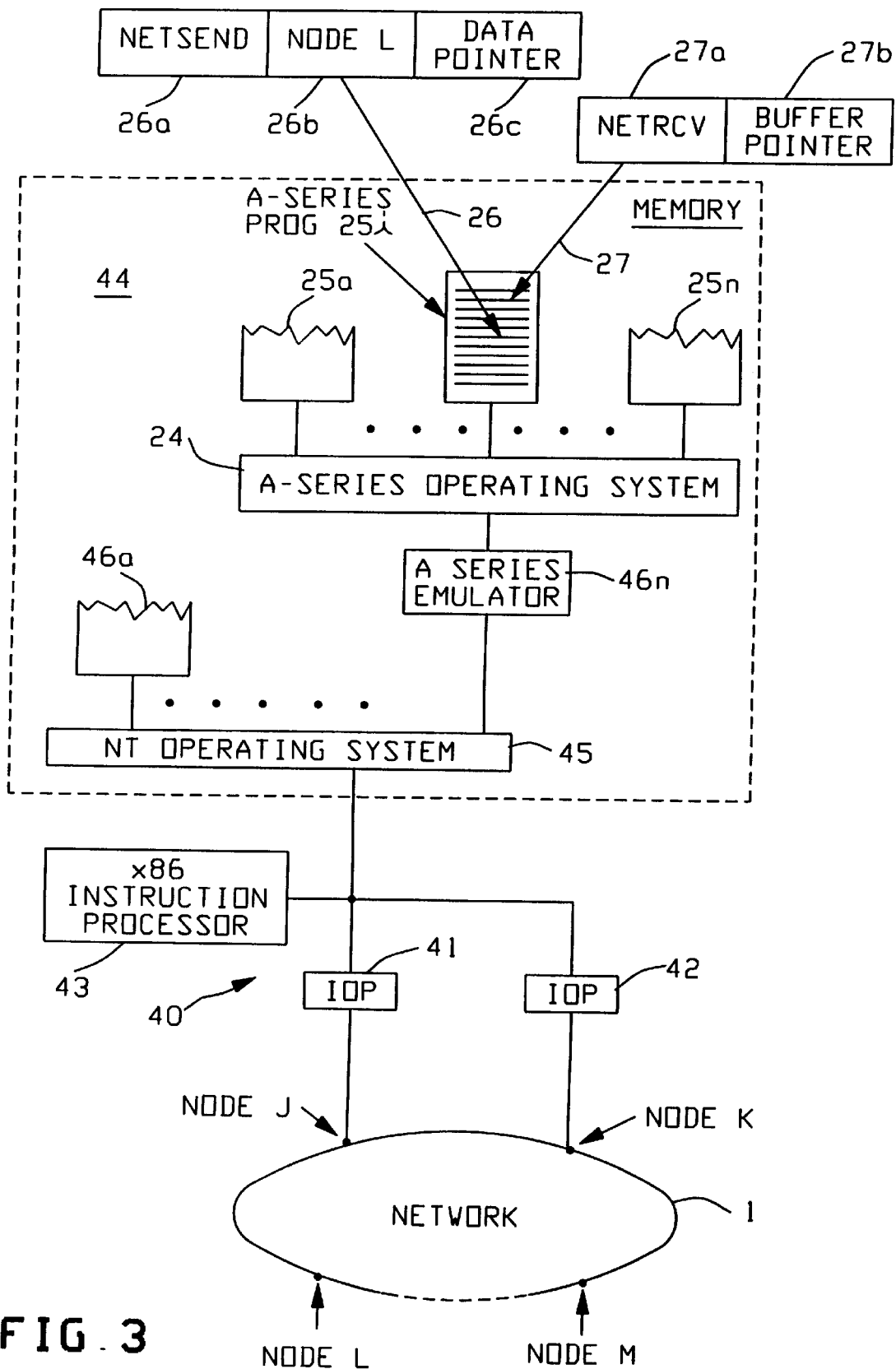
FIG. 3 shows a communication network on which data is sent and received in response to I/O instructions that are executed by emulation on a computer 40 which constitutes one preferred embodiment of the present invention.

Turning now to FIG. 3, it shows a computer 40 which constitutes one preferred embodiment of the present invention. This computer 40 includes a pair of I/O processors 41 and 42, an x86 instruction processor 43, and a memory 44. All of these components 41–44 are interconnected and coupled to the communication network 10 as shown.

Included in the memory 44 of the x86 instruction processor 43 are a native operating system 45 and multiple native application program 46a–46n. This operating system 45 and all of the programs 46a–46n are native to the x86 instruction processor 43 because they are a compilation of object code instructions that are executed directly by the x86 instruction processor.

Figure 1:
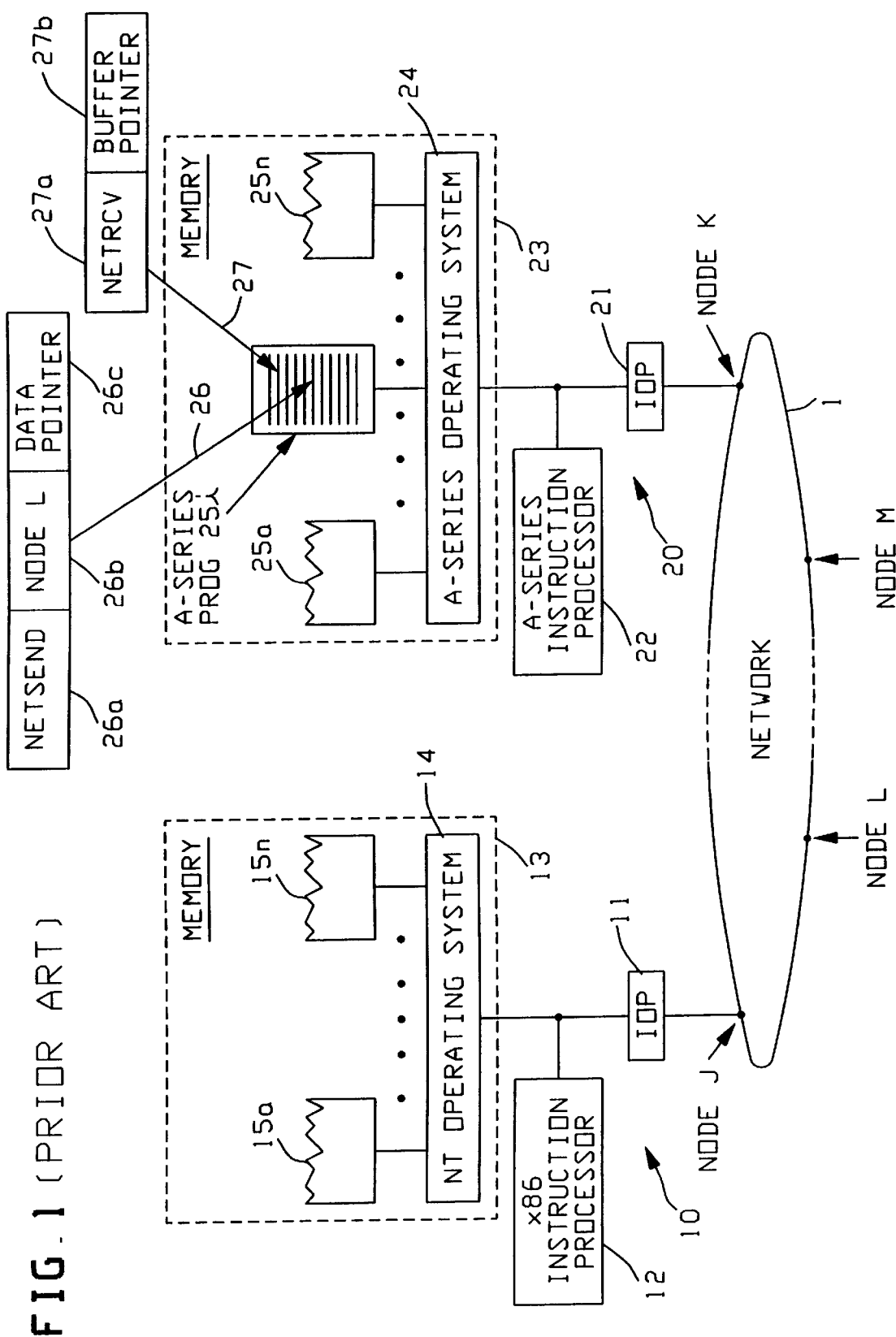
FIG. 1 shows a communication network on which data is sent and received in response to I/O instructions that are executed without emulation on a conventional computer 20.
Figure 2:
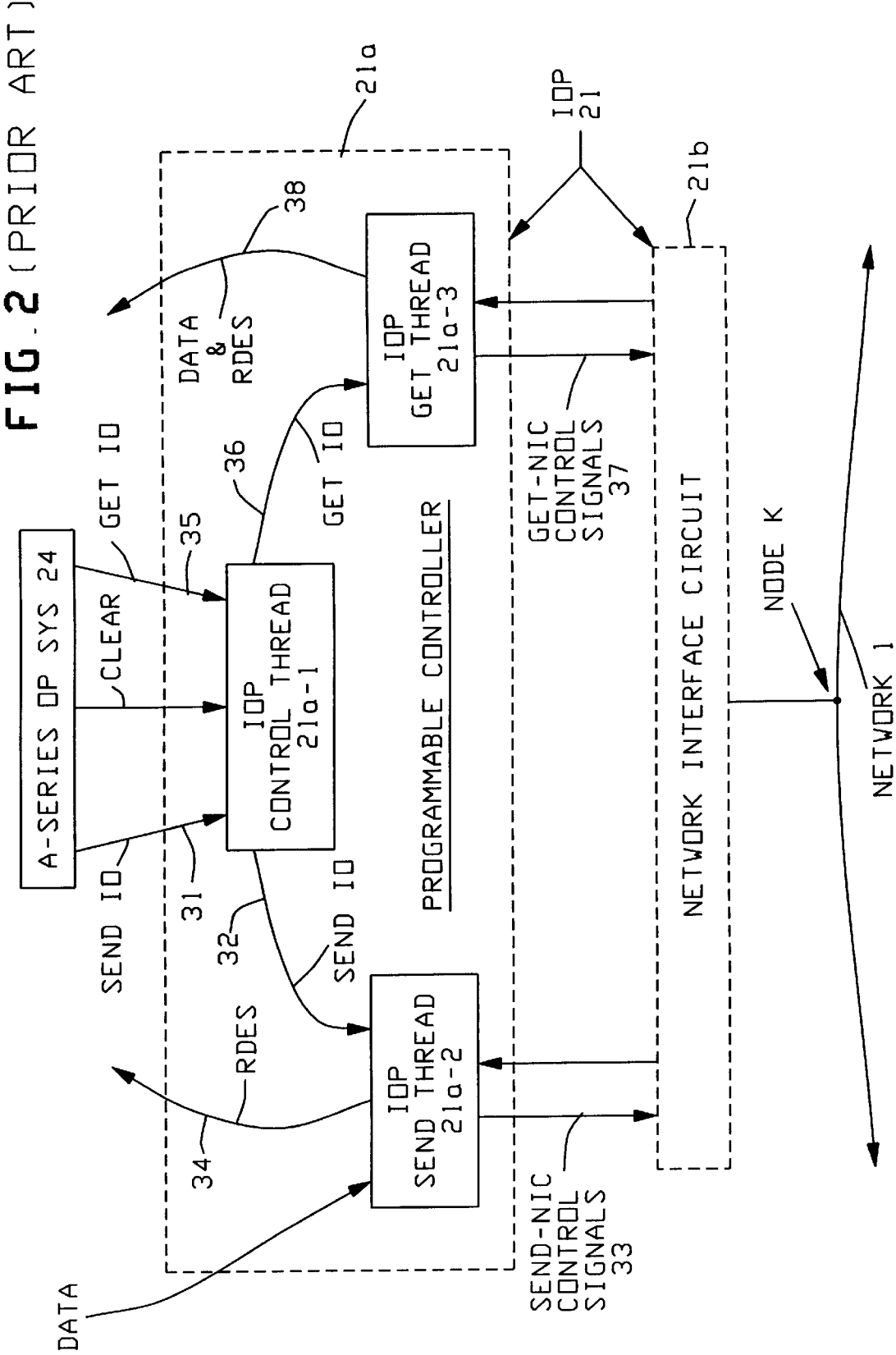
FIG. 2 shows additional details on how the computer 20 of FIG. 1 sends and receives data in response to the I/O instructions.

Also included in the memory 44 of the x86 instruction processor 43 are the A-Series operating system 24 and multiple A-Series application programs 25a–25n that were previously described in conjunction with FIG. 1. This operating system 24 and all of the programs 25a–25n consist of A-Series object code instructions; and they are foreign to the x86 instruction processor 43. Each A-Series instruction in the operating system 24 and the application programs 25a–25n is interpreted and executed by program 46n, which is an A-Series emulator.

To send data on the communication network 1 from an A-Series application program 25i, the program includes a NETSEND instruction such as instruction 26. This is the same instruction 26 that was described in conjunction with FIG. 1; and it includes a field 26a which specifies that data is to be sent on the network 1, a field 26b which identifies a node on the network to which the data is to be sent, and a field 26c which points to the data that is to be sent from the program 25i.

Likewise, to receive data from the network 1 in the A-Series application program 25i, the program includes a NETRCV instruction such as instruction 27. This is the same instruction 27 that was described in conjunction with FIG. 1; and it includes a field 27a which specifies that program 25i is to receive data from the network, and a field 26b which points to a buffer area in the program 25i for storing the received data.

Figure 4:
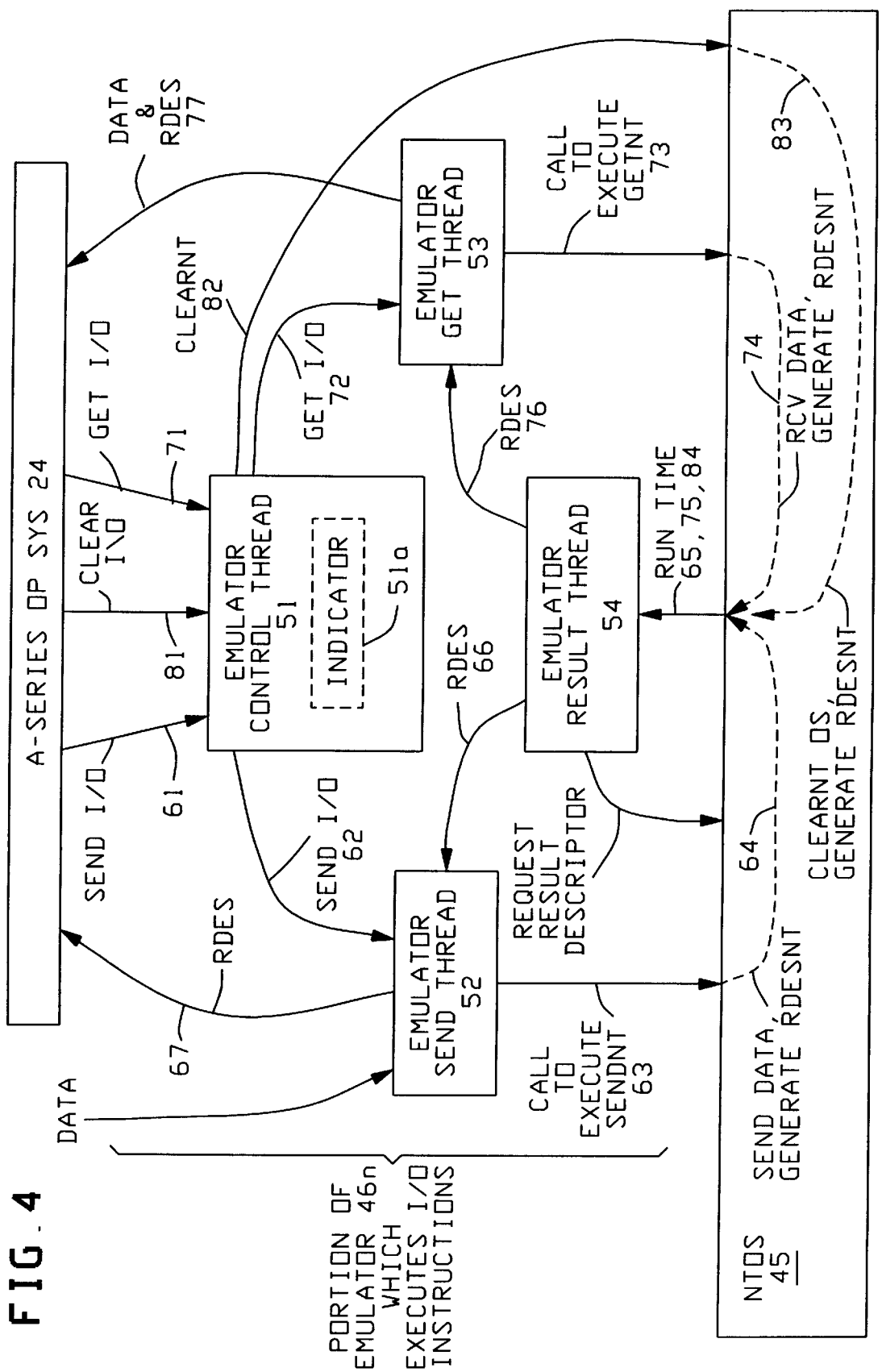
FIG. 4 shows additional details on how the computer 40 of FIG. 3 sends and receives data in response to the I/O instructions.

A portion of the emulator 46n which executes the I/O instructions 26 and 27 in accordance with the present invention is shown in FIG. 4. There, the A-Series emulator 46n is shown as including an emulator Control thread 51, an emulator Send thread 52, an emulator Get thread 53, and an emulator Result thread 54. Each of the emulator threads 51–54 initially enters a start-up state by running one time when the computer 40 powers on; and there they acquire the use of portions of the memory 44. Thereafter, the emulator threads 51, 52 and 53 run periodically on the x86 instruction processor under the control of the NT operating system 45; and the emulator Result thread 54 only runs when the NT operating system 45 reports a result for the I/O instructions 26 and 27.

When the I/O instruction 26 is to be executed, the A-Series operating system 24 initiates an A-Series SEND I/O command to the emulator Control thread 51 as indicated by reference numeral 61. This SEND I/O command is examined by the emulator Control thread 51 and passed to the emulator Send thread 52 as indicated by reference numeral 62. In response, the emulator Send thread 52 retrieves the data to be sent from the A-Series program 25i and translates the A-Series SEND I/O command to a corresponding command SENDNT which the NT operating system understands. Then the emulator Send thread 52 calls into the NT operating system 45 to execute the SENDNT command as indicated by reference numeral 63. Due to this call, the NT operating system 45 sends and receives control signals to/from the I/O processor 42 that cause the data to actually be sent to the network 1.

After the NT operating system 45 sends the data on the network 1, it generates an NT result descriptor RDESNT as indicated by reference numeral 64, which indicates the status of the data transfer. Then, the NT operating system 45 grants the emulator Result thread 54 run-time on the x86 instruction processor 43 as indicated by reference numeral 65. During this run-time the emulator Result thread translates the NT result descriptor to a corresponding result descriptor RDES which the A-Series operating system understands. Then the emulator Result thread passes the result descriptor RDES to the emulator Send thread 52 as indicated by reference numeral 66. Then the emulator Send thread 52 passes the result descriptor RDES to the A-Series operating system as indicated by reference numeral 66 and waits for the next SEND I/O command.

When the I/O instruction 27 is to be executed, the A-Series operating system initiates an A-Series GET I/O command to the emulator Control thread 51 as indicated by reference numeral 71. This GET I/O command is examined by the emulator Control thread 51 and passed to the emulator Get thread as indicated by reference numeral 72. In response, the emulator Get thread 53 translates the A-Series GET I/O command to a corresponding command GETNT which the NT operating system understands. Then the emulator Get thread 53 calls into the NT operating system 45 to execute the GETNT command as indicated by reference numeral 73. Due to this call, the NT operating system 45 sends and receives control signals to/from the I/O processor 42 that cause the data to actually be received from the network 1.

After the NT operating system 45 receives the data from the network 1, it generates an NT result descriptor RDESNT as indicated by reference numeral 74 which indicates the status of the data transfer. Then, the NT operating system 45 grants the emulator Result thread 54 run-time on the x86 instruction processor 43 as indicated by reference numeral 75. During this run-time, the Result thread translates the NT result descriptor to a corresponding result descriptor RDES which the A-Series operating system understands. Then the emulator Result thread passes the result descriptor RDES to the emulator Get thread 53 as indicated by reference numeral 76. This result descriptor and the received data is then passed by the emulator Get thread 53 to the A-Series operating system as indicated by reference numeral 77. Then, the emulator Get thread waits for the next GET I/O command.

At any time during the execution of the I/O instructions 26 and 27, the A-Series operating system can initiate an A-Series CLEAR I/O command to the emulator Control thread 51 as indicated by reference numeral 81. In response, the emulator Control thread 51 sets an indicator 51a and it sends a corresponding command CLEARNT to the NT operating system 45, as indicated reference numeral 82, which the NT operating system understands. Both the emulator Send thread 52 and the emulator Get thread 53 periodically check the indicator 51a and they terminate all of their operations when they sense that the indicator 51a is set.

By comparison, the emulator Result thread 54 cannot periodically test the indicator 51a because that thread is completely blocked from running between the processing of the result descriptors from the NT operating system. To clear the emulator Result thread, the NT operating system 45 responds to the CLEARNT command 82 by generating a dummy NT result descriptor RDESNT for the Result thread as indicated by reference numeral 83, and by granting the emulator Result thread run-time on the x86 instruction processor as indicated by reference numeral 84. During that run time, the Result thread 54 recognizes the dummy NT result descriptor and responds by terminating itself.

One particular feature of the FIG. 4 emulator program is that the task of sending and receiving control signals to/from the I/O port is passed from the foreign A-Series operating system 24 to the native NT operating system 45. This feature is achieved by the emulator Send thread 52 which calls into the NT operating system 45 to send data, and by the emulator Get thread 53 which calls into the NT operating system 45 to receive data. Consequently only the NT operating system needs to deal with the details of sending and receiving control signals to/from the I/O port.

Another feature of the FIG. 4 emulator program is that it provides a single Result thread 54 which processes result descriptors from the native NT operating system for both the send and receive operation. Consequently, the interface between the emulator and the native NT operating system is simplified since all results are reported to a single thread. Further, with this simple Result thread 54, the calls that are made into the NT operating system by the Send thread 52 and the Get thread 53 can occur in any unpredictable order; and the result descriptors which are generated for those calls can be sent to the Result thread independent of that order.

Also, another feature of the FIG. 4 emulator program is that the Result thread 54 wastes no run-time on the instruction processor while it waits for a result descriptor. This feature is achieved because the Result thread 54 is completely blocked from running between the generation of the result descriptors by the NT operating system. At the same time, the Result thread 54 emulator can be cleared at any time from the A-Series operating system by issuing a CLEARNT command to the NT operating system. This causes the NT operating system to generate a dummy result descriptor and grant run-time to the emulator Result thread so that it can clear itself.

Figure 5:
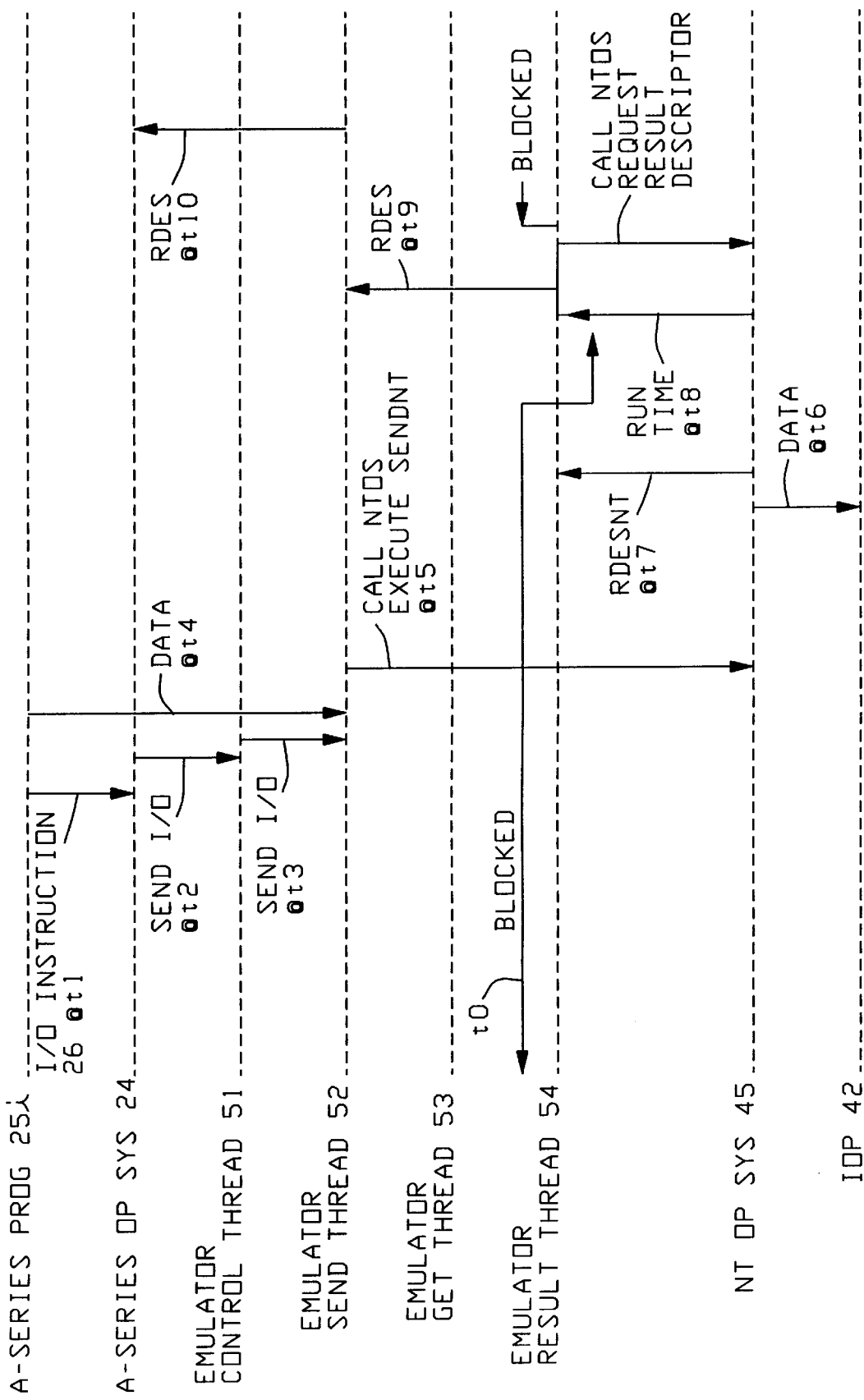
FIG. 5 is a timing diagram which shows further details on the execution of a NETSEND instruction by the computer of FIG. 3.

Referring now to FIG. 5, it provides a timing diagram that shows the sequence by which the NETSEND instruction 26 is executed. At time t0, each of the emulator threads 51–54 enters the start-up state and there acquires the use of portions of the memory 44. Such memory portions are used for example, as storage for the result descriptors and commands that are passed from one thread to another. Following this state, the emulator Result thread 54 is blocked from running on the x86 instruction processor, and it has a call into the NT operating system 45 requesting the next result descriptor that is generated. Thereafter, at time t1, the A-Series operating system 24 detects that the A-Series application program 25*i* wants to execute the I/O instruction 26. In response, at time t2, the A-Series operating system 24 issues the A-Series SEND I/O command to the emulator Control thread 51. Then at time t3, the emulator Control thread passes the SEND I/O command to the emulator Send thread 52. In response at time t4, the emulator Send thread 52 retrieves the data that is to be sent from the A-Series program 25*i* and translates the A-Series SEND I/O command to the corresponding NT command SENDNT. Then at time t5, the emulator Send thread 52 calls into the NT operating system 45 to send the retrieved data by executing the SENDNT command.

Thereafter at time t6, the NT operating system 45 sends and receives control signals to/from the I/O processor 42 that cause the data to actually be sent to the network 1. Then at time t7, the NT operating system sends the NT result descriptor RDESNT to the Result thread 54 which indicates the status of the data transfer; and then at time t8, the NT operating system grants run-time on the x86 instruction processor to the Result thread 54. During this run-time at time t9, the Result thread 54 translates the result descriptor RDESNT to the A-Series result descriptor RDES and sends it to the emulator Send thread 52. Then the Result thread becomes blocked from running until another result descriptor is generated by the NT operating system. Meanwhile at time t10, the emulator Send thread 52 passes the result descriptor RDES to the A-Series operating system, and then it waits for the next SEND I/O command.

Figure 6:
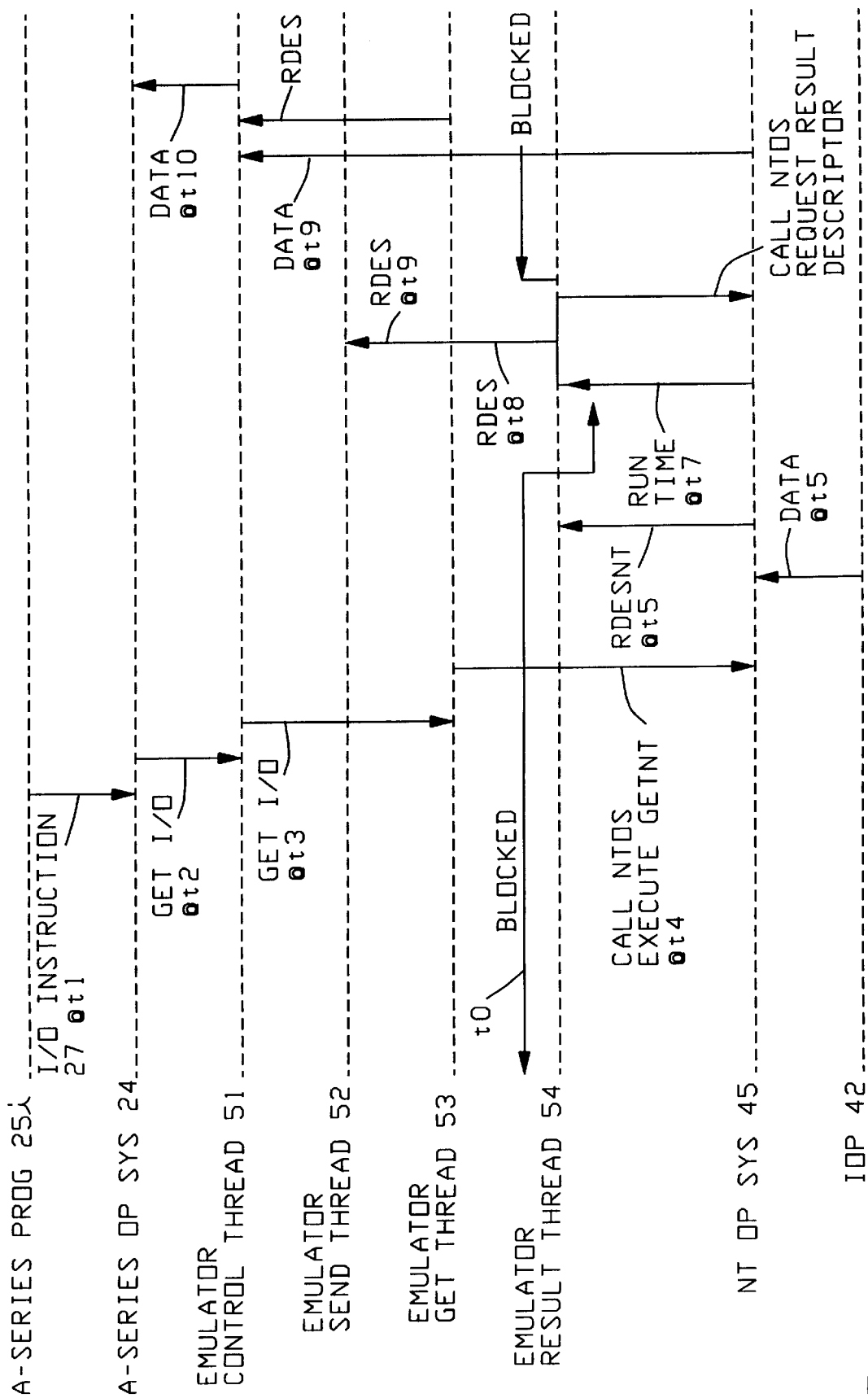
FIG. 6 is a timing diagram which shows further details on the execution of a NETRCV instruction by the computer of FIG. 3.

Similarly, FIG. 6 provides a timing diagram that shows the sequence by which the NETRCV instruction 27 is executed. At time t0, each of the emulator threads again enters the start-up state and acquires the use of portions of the memory 44. Following this state, the emulator Result thread 54 is again blocked from running on the x86 instruction processor, and it has a call into the NT operating system 45 requesting the next result descriptor that is generated. Thereafter, at time t1, the A-Series operating system 24 detects that the A-Series application program 25*i* wants to execute the I/O instruction 27. In response, at time t2, the A-Series operating system 24 issues the A-Series GET I/O command to the emulator Control thread 51. Then at time t3, the emulator Control thread passes the GET I/O command to the emulator Get thread 53 In response at time t4, the emulator Get thread 53 translates the A-Series GET I/O command to the corresponding NT command GETNT. Then the emulator Get thread calls into the NT operating system 45 to request data from the network 1 by executing the GETNT command.

Thereafter at time t5, the NT operating system 45 sends and receives control signals to/from the I/O processor 42 that cause the data to actually be received from the network 1. Then at time t6, the NT operating system sends the NT result descriptor RDESNT to the Result thread 54 which indicates the status of the data transfer; and then at time t7, the NT operating system grants run-time to the Result thread 54. During this run-time at time t8, the Result thread translates the result descriptor RDESNT to the A-Series result descriptor RDES and sends it to the emulator Get thread 53. Then the Result thread becomes blocked from running until another Result descriptor is generated by the NT operating system. Meanwhile at time t9, the emulator Get thread 53 transfers the data that was received to the A-series operating system 24, passes the result descriptor RDES to the A-Series operating system, and waits for the GET I/O command. Then at time t10, the A-series operating system 24 passes the data that it received to the A-series application program 25*i* and waits for the next GET I/O command.

Figure 7:
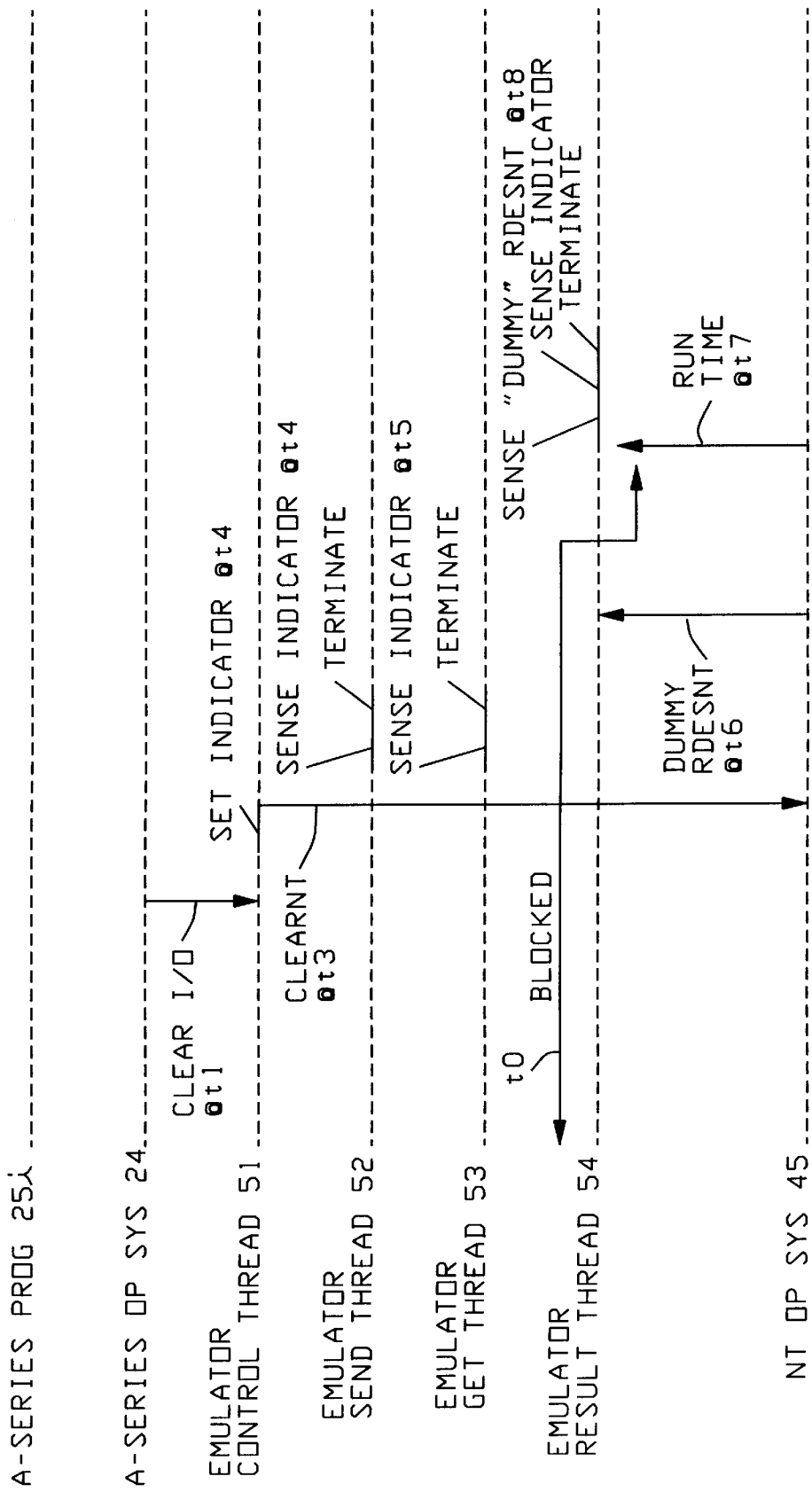
FIG. 7 is a timing diagram which shows further details on the execution of a CLEAR instruction by the computer of FIG. 3.

Next, FIG. 7 provides a timing diagram that shows a sequence by which the A-Series CLEAR I/O command is executed. This CLEAR I/O command may be initiated by the A-series operating system at any time t1; and that can occur during the execution of an I/O instruction 26 and/or 27 which was started at time t0. In response, at time t2, the emulator Control thread 51 sets an indicator 51*a*; and at time t3, it sends the corresponding NT command CLEARNT to the NT operating system 45. Both the emulator Send thread 52 and the emulator Get thread 53 periodically check the indicator 51*a*, and they terminate all of their operations when they sense that the indicator 51*a* is set. This occurs in FIG. 7 at times t4 and t5.

By comparison, the emulator Result thread 54 is completely blocked from running between the processing of result descriptors. To clear the emulator Result thread, the NT operating system 45 responds to the CLEARNT command by terminating any data transfer that it previously started for the Send thread 52 and Get thread 53, and by generating a dummy NT result descriptor for the Result thread 54. Then, at time t7, the NT operating system 45 grants run time to the emulator Result thread; and during that run time, at time t8, the Result thread 54 recognized the dummy NT result descriptor and responds by terminating itself.

After the emulator Result thread 54 terminates, the emulator Control thread 51 deallocates all portions of the memory 44 which were acquired by the emulator threads 51–54 in their start-up states. Due to this deallocation, all portions of the memory 44 which are used by the emulator threads 51–54 are accounted for and so no memory resource leaks occur.

One preferred embodiment of the present invention has now been described in detail. In addition however, various changes and modifications can be made to the details of this preferred embodiment without departing from the nature and spirit of the invention.

For example, the I/O instruction which are processed by the emulator threads 51–54 need not have the exact same format as the instruction 26 and 27 that are shown in FIGS. 1 and 3. Instead, instruction 26 can be any I/O instruction which initiates the transmission of data to a peripheral device, and such an instruction is herein generically called a TRANSMIT I/O instruction. Likewise, instruction 27 can be any I/O instruction which initiates the receipt of data from a peripheral device, and such an instruction is herein generically called a RECEIVE I/O instruction.

Also, the instruction processor 43 in FIG. 3 and the operating system 45 in FIG. 3 need not respectively be the x86 instruction processor and NT operating system; but instead, they can be any instruction processor and operating system which is native to that instruction processor. Likewise, the emulator 46*n* in FIG. 3 and the operating system 24 in FIG. 3 and the application programs 25*a*–25*n* in FIG. 3 need not respectively be an A-Series emulator and an A-Series operating system and A-Series application programs; but instead, they can be any emulator and operating system and application programs which are foreign to the instruction processor 43. For example, the application programs 25*a*–25*n* can be application programs for the Unisys 2200 Series computer; the operating system 24 can be the operating system for the Unisys 2200 Series computer; and the emulator 46*n* can be a compilation of object code instructions that are native to the instruction processor 43 and which interpret all of the 2200 series instructions.

Accordingly, it is to be understood that the invention is not limited to the details of just the illustrated preferred embodiment, but is defined by the appended claims.

What is claimed is:

1. A computer which is comprised of:

an instruction processor, coupled to a memory and an I/O port, which directly executes a first set of object code instructions;

a native operating system for all program in said memory, which is a compilation of instructions in said first set;

a foreign application program in said memory, which is a compilation of instructions in a second set that differs from said first set, including a TRANSMIT I/O instruction and a RECEIVE I/O instruction;

an emulator program, in said memory, which is a compilation of instructions in said first set that interprets said second set of instructions; characterized in that said emulator program includes a Send thread which calls into said native operating system, to send data from said foreign application program to said I/O port in response to said transmit I/O instruction;

a Get thread which calls into said native operating system to receive data for said foreign application program from said I/O port in response to said receive I/O instruction; and, a single Result thread which a) processes one result descriptor that is received from said native operating system when data is sent for said Send thread, and processes another result descriptor that is received from said native operating system when data is received for said Get thread, and b) is completely blocked from running at any time on said instruction processor between the processing of said result descriptors.

2. A computer according to claim 1 wherein said emulator program further includes a Control thread which sends a CLEAR command to said operating system asynchronously with respect to the transfer of said data, and wherein said Result thread becomes unblocked and clears itself by receiving a result descriptor from said operating system in response to said CLEAR command.

3. A computer according to claim 2 wherein said calls by said Send thread and said Get thread occur in an unpredictable order, and said descriptors are processed independent of that order.

4. A computer according to claim 3 wherein said descriptors are stored in predetermined storage areas and are deallocated by said Control thread only after said Result thread clears itself.

5. A computer according to claim 4 wherein said Control thread sets an indicator when said CLEAR command is sent, and wherein said Send thread and said Get thread run periodically and clear themselves in response to said indicator being set.

6. A computer according to claim 1 wherein said first set of instructions includes object code instructions for an x86 computer, and said second set of instructions includes object code instructions for an A-Series computer.

7. A method of transferring data between a foreign application program in a computer and an I/O port on said computer; said method including the steps of:

providing an emulator program which has a Send thread, a Get thread, and a single Result thread;

calling into an operating system for said computer from said Send thread, to send data from said foreign application program to said I/O port;

calling into said operating system from said Get thread, to receive data from said I/O port for said foreign application program; wherein said method is characterized by the additional steps of receiving and processing one result descriptor in said Result thread, which is sent by said operating system, when data is sent for said Send thread; and receiving and processing another result descriptor in said Result thread, which is sent by said operating system, when data is received for said Get thread; and, completely blocking said Result thread from running at any time on said computer between the processing of said result descriptors.

8. A method according to claim 7 and further including the steps of: sending a CLEAR command from said emulator to said operating system asynchronously with respect to the transfer of said data; and, unblocking and clearing said Result thread by receiving a result descriptor from said operating system in response to said CLEAR command.

9. A method according to claim 7 wherein said calls by said Send thread and said Get thread occur in an unpredictable order, and said result descriptors are processed independent of that order.

10. A method according to claim 7 wherein said result descriptors are stored in predetermined storage areas which are deallocated only after a result descriptor from said operating system is received by said Result thread.

11. A program storage device, readable by a computer, having an emulator program stored therein that is a compilation of object code instructions that are executable by said computer; said emulator program in said program storage device being comprised of:

a Send thread which calls into an operating system to initiate the sending of data for said emulator program to an I/O port on said computer;

a Get thread which calls into said operating system to initiate the receipt of data from said I/O port for said emulator program; wherein said program in said program storage device is characterized by further including a single Result thread which a) receives and processes a first result descriptor, from said operating system, when data is sent for said Send thread, b) receives and processes a second result descriptor, from said operating system, when data is received for said Get thread, c) receives and processes a third result descriptor, from said operating system when said Result thread is to be cleared; and d) is completely blocked from running at any time on said computer between the processing of said result descriptors.

* * * * *